United States Patent [19]
Akashi et al.

[11] 3,841,858
[45] Oct. 15, 1974

[54] APPARATUS FOR PRODUCING A RIBBON-LIKE GLASS HAVING A METAL OXIDE COATING FORMED THEREON

[75] Inventors: Naotomo Akashi; Katsuji Fujimoto, both of Kyoto, Japan

[73] Assignee: Nippon Sheet Glass Co., Ltd., Osaka, Japan

[22] Filed: Mar. 12, 1973

[21] Appl. No.: 340,107

[30] Foreign Application Priority Data
Mar. 17, 1972  Japan............................. 47-27837

[52] U.S. Cl............................ 65/181, 65/60, 118/49
[51] Int. Cl............................................ C03c 17/10
[58] Field of Search .................... 65/60, 181; 118/49

[56] References Cited
UNITED STATES PATENTS

| | | | |
|---|---|---|---|
| 3,652,246 | 3/1972 | Michelotti et al. | 65/60 X |
| 3,689,304 | 9/1972 | Bamford | 65/60 X |

Primary Examiner—Arthur D. Kellogg
Attorney, Agent, or Firm—Wenderoth, Lind & Ponack

[57] ABSTRACT

An apparatus for producing a ribbon-like glass having a uniform metal oxide coating formed thereon, said apparatus comprising a spray gun providing opposite to the surface of a ribbon-like glass at a position which is between a ribbon-like glass forming device and an annealing lehr and at which the temperatue of the facing glass ribbon is at least 400°C., means for supplying a solution of a metal compound to said spray gun, means for spraying out said solution from said spray gun, a pair of exhaust pipes for gases resulting from the sprayed metal compound solution, said pipes being disposed on both sides of said spray gun and having suction holes at their lower portions, a discharge device for sucking the exhaust gases from the neighborhood of the glass surface through said suction holes, and at least one pipe for releasing an incombustible gas toward the surface of the glass ribbon and diluting leaked exhaust gases, said pipe being disposed along the walls constituting the suction holes and on that side of the exhaust pipes which is opposite to the spray gun.

4 Claims, 5 Drawing Figures

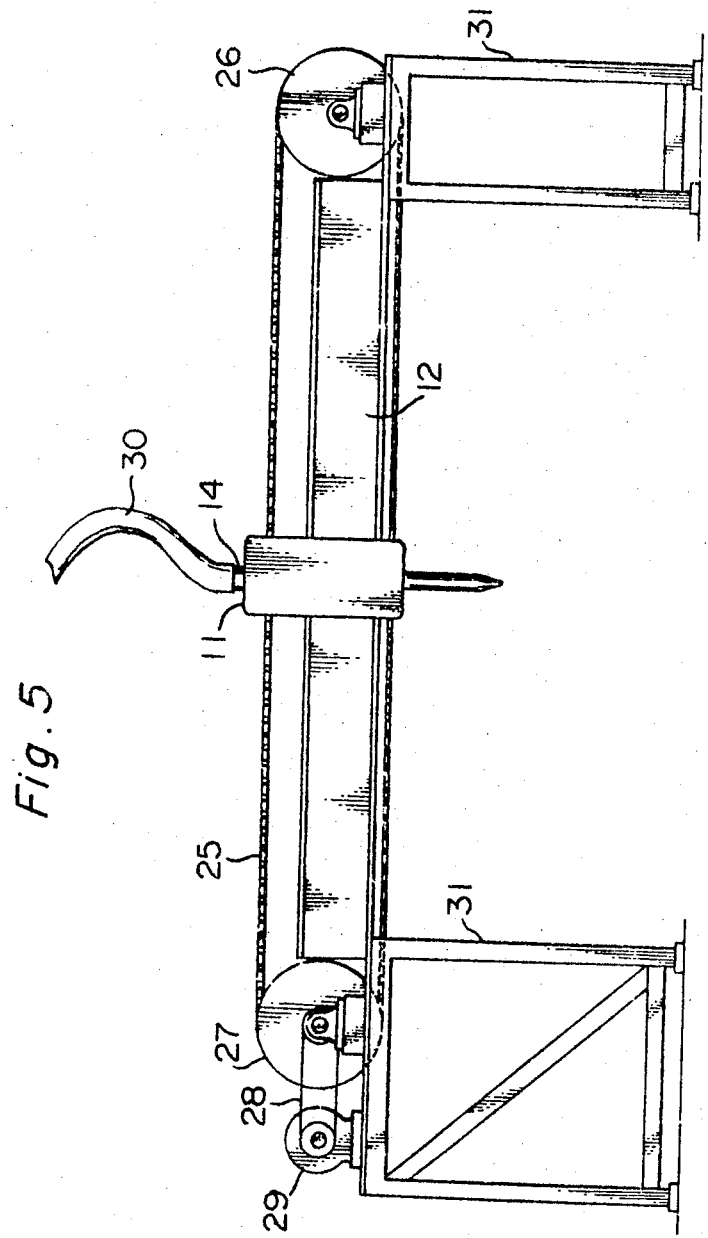

APPARATUS FOR PRODUCING A RIBBON-LIKE GLASS HAVING A METAL OXIDE COATING FORMED THEREON

This invention relates to an apparatus for forming a metal oxide coating on a sheet glass. More specifically, the invention relates to an apparatus for forming a thin coating of a metal oxide on the surface of a ribbon-like glass in, and in the vicinity of, an annealing lehr in a glass ribbon forming apparatus.

The concept of adhering a thin coating of a metal oxide to the surface of a glass ribbon formed from molten glass is not a new one, but is well known to those skilled in the art. The materialization of this technical concept will be briefly described.

A solution of a metal compound capable of being pyrolyzed to a metal oxide by heating is readily available. When this solution is sprayed against the surface of glass ribbon during the production of the glass ribbon, a thin coating of the metal oxide is formed on the surface of the glass ribbon. For the past two or three years, the following glass coating processes have been known. These processes involve spraying a solution of a pyrolyzable metal compound onto a glass ribbon advancing between a molten metal bath and an annealing lehr to form a colored thin coating of the resulting metal oxide on the surface of the glass ribbon. Apparatuses for performing these processes have been provided in which a spray gun is used to spray the solution of metal compounds, or the spray gun is reciprocatingly moved in a direction across the ribbon-like glass, or exhaust gases generated as a result of pyrolysis are discharged by suction forces. However, various difficulties have been experienced in operating these apparatuses.

One of the most serious problems is the disposal of exhaust gases which are evolved at the time of spraying the solution. This problem could be solved by providing an exhaust pipe to remove the exhaust gases by suction forces. However, since the solutions of metal compounds usually contain strongly inflammable solvents such as benzene or alcohol, the exhaust gases that have leaked frequently catch fire, and cause the combustion of the solutions to be sprayed, making it impossible to form a thin coating of a metal oxide on the surface of a ribbon-like glass. The prior art, however, has offered no satisfactory improvement in this regard.

The present invention has succeeded in remedying these defects of the prior art. Firstly, in order to form a thin coating of a metal oxide uniformly on the surface of a ribbon-like glass, a spray gun which runs or oscillates in a direction across the advancing direction of the ribbon-like glass is provided opposite to the surface of the glass ribbon. A region of the glass ribbon which corresponds to the position of the spray gun is at a temperature of at least 400°C. This ensures the uniform spraying of a solution of a metal compound in the atomized state to the surface of the glass ribbon. Secondly, in order to suck exhaust gases effectively, a pair of exhaust pipes are provided parallel in proximity to a passageway for the spray gun in a manner to interpose said passageway therebetween. An opening for sucking exhaust gases uniformly is provided in each of the exhaust pipes along its entire length, and each of said exhaust pipes is connected to the entry of an air discharging device. Thirdly, a conduit is provided in the neighborhood of the exhaust gas pipes on the opposite side to the spray gun in order to blow a non-combustible compressed gas such as air or nitrogen gas against the surface of the glass ribbon through a gap provided on the under surface of the glass ribbon. Thus, the exhaust gas is diluted with the air to reduce its flammability.

As a result of these improvements, a uniform thin coating of a metal oxide can be formed on the surface of the ribbon-like glass. Furthermore, the exhaust gases generated at the time of forming the thin coating are sucked and removed to prevent the occurrence of fire. A further advantage is that by applying compressed air to the exhaust gases leaked from the suction device, the flammability of the exhaust gases is reduced. Consequently, the present invention has made it possible to produce an excellent ribbon-like glass having a metal oxide coating thereon.

The invention will be described in greater detail with reference to the accompanying drawings in which:

FIG. 5 is a side elevation of an apparatus for causing a reprocal movement of the spray gun.

Figure 2:
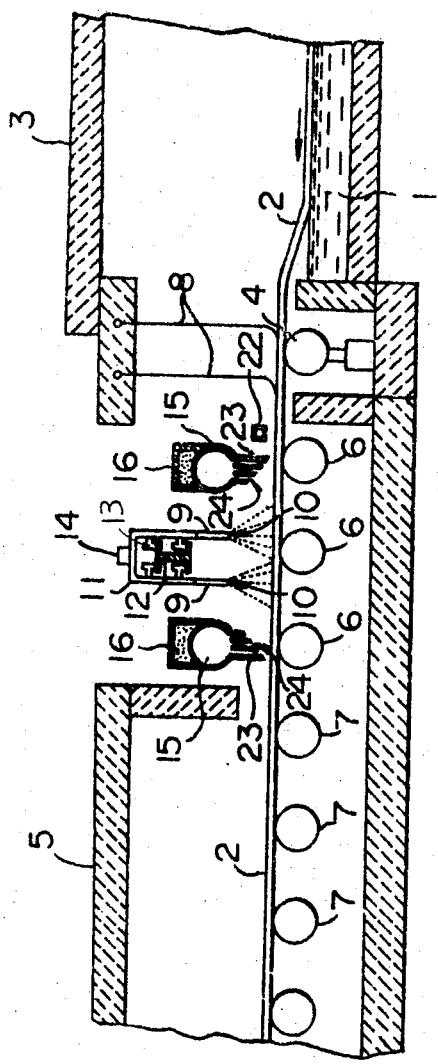
FIG. 2 is a side elevation taken along the line 2—2 of FIG. 1.

In FIG. 2, a part of a float glass producing apparatus is shown. Molten glass is fed at a predetermined rate from a glass melting furnace (not shown) onto a molten metal bath 1 within a molten metal bath tank 3. The resulting ribbon-like glass 2 advances in a direction shown by the arrow. The glass 2 is pulled out of the molten metal bath 1 by means of a pick-up roll, and is caused to advance to an annealing lehr by conveyor rolls 6 and lehr rolls 7. In the annealing lehr 5, the glass ribbon is gradually cooled. An asbestos curtain 8 is suspended from the ceiling of the molten metal bath tank 3 at its exit portion to shut off the atmosphere from the outer atmosphere. A device for forming a metal oxide coating on the surface of glass in the present invention is provided intermediate the molten metal bath tank 3 and the annealing lehr 5.

Figure 1:
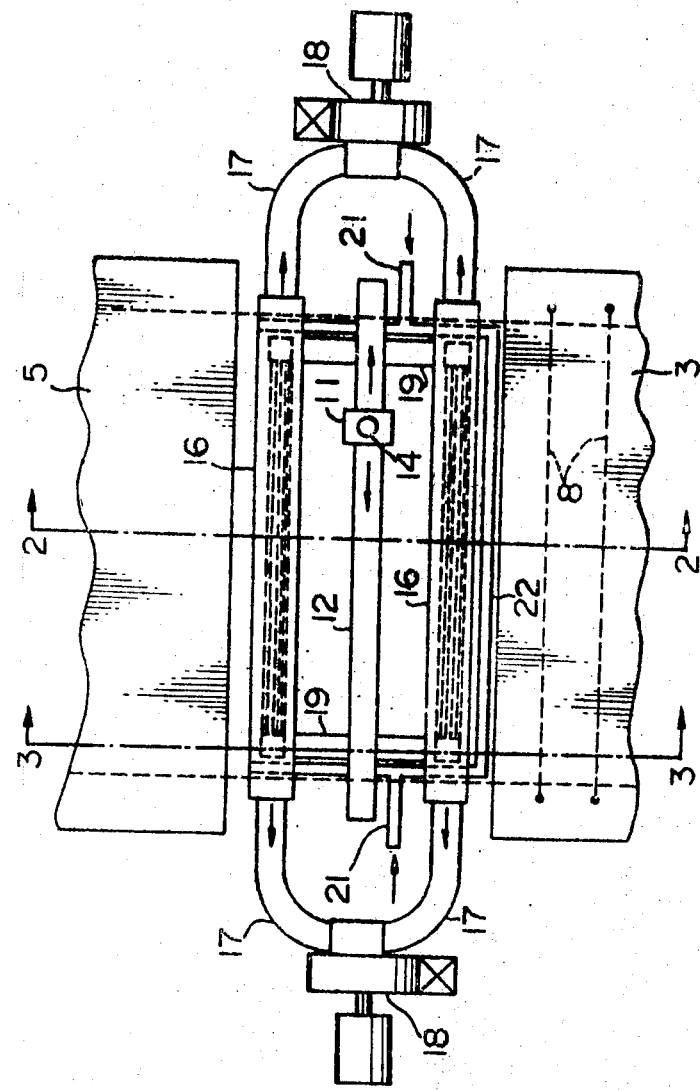
FIG. 1 is a plan view of one embodiment of the present invention.
Figure 4:
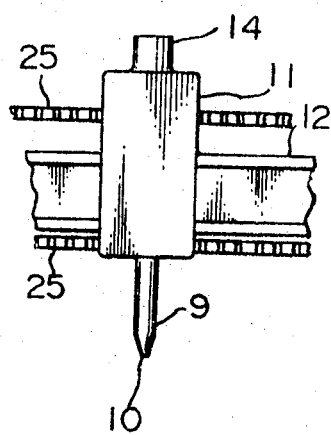
FIG. 4 is a side elevation of a spray gun.

First a traverse device for the spray gun will be described. As shown in FIG. 1, one guide rail 12 is disposed above the glass ribbon in a direction across the glass ribbon, and as shown in FIG. 5, is supported by frames 31 at both ends. The relationship between the guide rail 12 and the spray gun 9 is shown in FIGS. 2 and 4. The spray gun 9 is secured to a support member 11 so as to face the upper surface of the glass ribbon at a position spaced from it by a suitable distance. As previously stated, the glass ribbon at this position is held at a temperature of at least 400°C. The support member 11 is a double-walled box having an entrance 14 and bifurcated at the bottom, and a spray gun 9 is provided at each of the lower ends of the bifurcated portion with a nozzle 10 formed at each of the ends. A projection 13 is fitted to the inside surface of the double-walled bifurcated box, and comes in contact with the guide rail 12 so as to slide over the surface of the guide rail 12.

The entrance 14 is connected to a flexible tube 30 which includes a flexible pipe for receiving a solution of a metal oxide under pressure from a pump (not shown) and feed it into a spray nozzle, a flexible pipe for feeding compressed air into the spray gun to atomize the solution and flexible pipes for the supply and discharge of cooling water to cool the nozzle 10 of the spray gun and is connected to the support member 11 while the individual flexible pipes are connected to the predetermined positions of the spray gun.

One example of the device for traversing the spray gun 9 is shown in FIGS. 4 and 5. Endless chains 25 are disposed so as to extend through the bifurcated portion of the support member 11, and the endless chain 25 at the upper part is fixed to the support member 11. By the movement of the upper chain, the support member 11 and the spray gun 9 move together. The endless chains 25 are stretched over sprockets 26 and 27 supported by the frames 31. The sprocket 26 is driven by a motor 29 through a chain 28. By repeatedly rotating the motor 29 forward and backward with a predetermined cycle, the support member 11 and the spray gun 9 traverse over the ribbon-like glass. The traversing of the spray gun may be performed by any other methods known in the art.

FIG. 2 illustrates the state of spray issuing from the nozzle 10 at the forward end of the spray gun 9. The temperature of the ribbon-like glass to which the spray is applied is suitably about 600°C. The metal compound solution applied thereto immediately heat decomposes to evolve large quantities of exhaust gases. As previously stated, the exhaust gases contain gasified flammable solvents.

Figure 3:
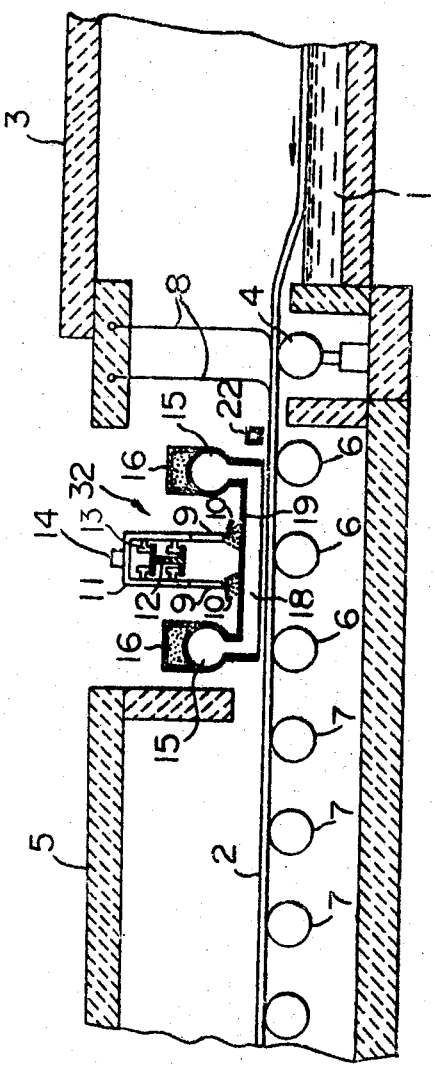
FIG. 3 is a side elevation taken along the line 3—3 of FIG. 1.

A discharge device is provided so as to remove the exhaust gases without leakage. As shown in FIGS. 1, 2 and 3, an exhaust pipe 15 is provided on each side of the spray device extending in a direction across the glass ribbon. The upper portion of the exhaust pipe 15 is covered with a heat insulating material 16, and its lower part is open to form a suction hole 24. The suction hole 24 is partitioned by a number of walls 23 which are arranged in parallel to the axial line of the exhaust pipe 15 with small gaps there-among. The length of the walls is the smallest at the part nearest the spray device and progressively increases away from it. The lower end of outermost wall 23 is made to approach the surface of the glass ribbon.

The provision of the walls 23 serves to render the suction uniform. Referring to FIG. 1, an exhaust fan 18 is provided on each side of the passageway for the glass ribbon, and the suction holes of the exhaust fans are connected to both ends of the exhaust pipes 15 by a curved pipe 17. The exhaust gases are sucked in the direction shown by the arrow, and removed by the fans 18. In the absence of the walls 23 at the suction holes 24 at the lower parts of the exhaust pipes 15, the suction forces are strong at the part near both ends of the exhaust pipes 15, and become weaker at the central part. This causes non-uniformity of the discharging of the exhaust gases from the surface of the glass ribbon. This difficulty has been overcome by the present invention by providing the walls 23.

As shown in FIGS. 1 and 3, the pair of the exhaust pipes 15 are connected by conduits 19. The walls of the conduits 19 extend to near the surfaces of both sides of the glass ribbon, and suction holes for the exhaust gases are provided opposite to the surface of the ribbon-like glass.

The apparatus of this invention further includes a pipe 22 for releasing compressed air, which is provided parallel to the exhaust pipe 15 located upstream of the flow of the glass ribbon 2 and further upstream of said exhaust pipe 15. An opening for the releasing of compresed air is provided in the lower portion of the pipe. The pipe 22 is connected to an inlet pipe 21, and compressed air is introduced into the releasing pipe 22 via the inlet pipe 21. Compressed air released from the pipe 22 collides with the surface of the glass ribbon 2 and separates to left and right in FIG. 2. The separated flow of compressed air flowing to the left blocks the exhaust gases which leak out from the lower most portion of the walls of the exhaust pipe 15. Even if some exhaust gases leak out, they are diluted with the released air to lose their flammability.

The releasing pipe 22 is provided on the side of the molten metal bath tank 3 because the temperature is high on that side and this is very likely to cause fire owing to the exhaust gases. Thus, fire ascribable to the exhaust gases on the side of the tank 3 can be completely prevented.

The space defined by the pair of the exhaust pipes 15 and the conduits 19 connecting these pipes is called a spray chamber 32. The metal compound solution sprayed by the spray gun 9 heat decomposes within the spray chamber 32 to form a thin coating of the metal oxide on the surface of the glass ribbon and at the same time evolves large quantities of exhaust gases. It is the object of this invention to dispose of these exhaust gases properly.

The heat-decomposable metal compounds used in the performance of this invention may be organic compounds of metals such as chromium, iron, cobalt, tin, titanium, calcium and magnesium, especially metal acetylacetonates or metal fatty acid esters such as dimethyl-tin-bipropionate or titanic acid ester; or inorganic compounds of these metals. These metal compounds are used as solutions in a flammable organic solvent such as alcohol, benzene, chloroform, methylene chloride, acetyl acetone, petroleum benzine, toluene or pyridine.

When a metal compound solution is sprayed by a spray gun toward a sheet glass maintained at high temperatures, most of it adheres to the glass and is decomposed to a metal oxide. Almost all of the remainder of the spray that has not adhered to the glass is sucked and removed as an exhaust gas from near the surface of the glass through the suction holes of the exhaust device. A part of the remainder tends to scatter in the longitudinal direction of the glass ribbon from between the wall of the suction holes and the glass ribbon. However, it is blocked by a gas curtain formed by a means for blowing a non-flammable gas toward the surface of the glass ribbon, which is provided along the wall which constitutes the suction hole and on that side where the spray gun is absent. Then, it is sucked from the suction hole, and even when the exhaust gas leaks from between the wall of the suction hole and the glass ribbon, the exhaust gas is diluted with the gas of the gas curtain, or a weak combustion reaction occurs to a degree such that no flame occurs. This leads to the loss of flammability. Accordingly, the metal compound solution sprayed does not catch fire from the scattering exhaust gas, and the formation of a thin coating of a metal oxide on the glass ribbon is ensured.

The operation of the apparatus described above will be described.

Molten glass is caused to flow onto the molten metal bath 1 at a predetermined rate and to advance over it to form a glass layer 2. The resulting ribbon-like glass 2 is withdrawn, and transferred to the annealing lehr 5 at a predetermined speed. The temperature of the glass ribbon which has arrived at the spray chamber 32 is about 600°C. A solution consisting of 2.5% by weight of cobalt acetylacetonate, 2.5% by weight of chromium acetylacetonate, 2.25% by weight of iron acetylacetonate, 0.5% by weight of titanium acetylacetonate and 92.55% by weight of a 1:1 mixture of methanol and benzene is supplied from a tank (not shown) to the nozzle 10 of the spray gun 9. The nozzle 10 is cooled with cooling water to avoid the heat decomposition of the metal compound solution, and compressed air is supplied to the spray gun from a compressor (not shown). The metal compound solution is sprayed from the nozzle 10 towards the upper surface of the glass ribbon 2. The support member 11 for the spray gun 9 moves reciprocatingly along the guide rail 12. During this time, the spray gun 9 continuously sprays the metal compound solution to the upper surface of the moving glass ribbon. The sprayed solution fills the spray chamber 32 as mist, and decomposed by the heat of the glass ribbon 2 to form a thin coating of the metal oxides on the surface of the glass ribbon. Substantially all of the sprayed coating is gasified, and sucked and removed from the spray chamber 32 through the suction holes 24. A part of the sprayed solution (exhaust gas) tends to flow out of the spray chamber 32 from between the suction holes 24 and the glass ribbon 2, but is blocked by air which is blown against the upper surface of the glass ribbon 2 at a rate of 2–10 m³/minute from the slit of the pipe 22 provided upstream of the suction hole 24 located upstream of the spray gun 9. Even if the exhaust gas leaks out of the spray chamber 32, hydrogen gas, carbon monooxide, etc. which have resulted from the decomposition of the solvent of the metal compound solution burn by the aid of the air from the pipe 22 or are diluted with the air to lose their flammability.

Accordingly, flames issuing from under the asbestos curtain 8 at the exit of the molten metal bath tank 3 do not ignite the gasified solvent of the metal compound solution, but it is possible to accurately transfer the glass ribbon coated with a metal oxide layer into the annealing lehr 5.

While we have described the invention with reference to one embodiment shown above, it should be understood that the invention is not limited to this embodiment. For example, the above description is direction is directed to an apparatus for producing float glass, but the invention can be applied to other types of apparatus for producing a sheet glass, such as those for use in producing sheet glass by the Colburn process or the rolled process.

Incidentally, the releasing pipe 22 for blowing a gas toward the surface of the glass ribbon 2 is not always required to extend to the side edges of the glass sheet 2 along the conduit 19. Furthermore, another pipe for blowing a gas toward the surface of the sheet glass can be provided along the suction hole 24 located downstream of the spray gun 9 (that is, on the side of the annealing lehr).

What is claimed is:

1. In an apparatus for producing a ribbon-like glass having a metal oxide coating formed thereon, said apparatus having a spray gun provided opposite to the surface of a ribbon-like glass at a position which is between a point between a ribbon-like glass forming device and an annealing lehr and a point within said annealing lehr and at which position the temperature of the glass ribbon opposed to the spray gun is at least 400°C., said spray gun being adapted to move in the widthwise direction of the glass ribbon, means for supplying a solution of a metal compound to said spray gun, and means for spraying out said solution of metal compound from said spray gun, the improvement comprising a pair of exhaust pipes disposed on both sides of the path of movement of said spray gun, the lower portions of said exhaust pipes having suction openings therein, a discharge device coupled to said exhaust pipes for sucking exhaust gases resulting from the sprayed metal compound solution from the neighborhood of the glass surface through said suction holes, and a plurality of walls depending from said exhaust pipe to near the surface of the glass ribbon and disposed parallel to the axial line of the exhaust pipe and defining fine gaps therebetween extending to said suction openings, the innermost wall situated nearest to the spray gun being shortest, and the walls becoming progressively longer the more remote they are from the spray gun.

2. The apparatus of claim 1 further comprising two pipes for releasing an incombustible gas, said pipes being both on the glass forming device side and the annealing lehr side of the spray chamber.

3. The apparatus of claim 1 further comprising conduits connecting said exhaust pipes on both sides of the glass ribbon, the walls of the conduits being near the surface of both side edges of the glass ribbon, and said conduits having suction holes therein for exhaust gases opposite to the surface of the glass ribbon.

4. The apparatus of claim 3 wherein said incombustible gas releasing pipe extends curvedly along the walls of the conduits.

* * * * *